United States Patent [19]

Pierson et al.

[11] Patent Number: 5,510,991
[45] Date of Patent: Apr. 23, 1996

[54] CONFIGURABLE AUTOMATIC PILOTING DEVICE FOR AERODYNES

[75] Inventors: Benoit Pierson, Paris; Georges Guiol, Limours; Florence Limon, Yvette, all of France

[73] Assignee: Sextant Avionique, Meudon la Foret, France

[21] Appl. No.: 257,099

[22] Filed: Jun. 7, 1994

[30] Foreign Application Priority Data

Jun. 7, 1993 [FR] France .................................. 93 06863

[51] Int. Cl.$^6$ ........................... G06F 15/00; G06F 165/00
[52] U.S. Cl. ........................................... 364/434; 244/178
[58] Field of Search ..................................... 364/434, 433, 364/180, 133, 424.01; 244/177, 178, 194–197; 318/564

[56] References Cited

U.S. PATENT DOCUMENTS

| | | | |
|---|---|---|---|
| 4,658,359 | 4/1987 | Palatucci et al. | 364/424.01 |
| 4,849,893 | 7/1989 | Page et al. | 364/434 |

FOREIGN PATENT DOCUMENTS 8400071  1/1984  WIPO .

OTHER PUBLICATIONS

Herbella, Gary. "Modularity Concepts for the Multi–path Redundant Avionics Suite (MPRAS)." 9th Digital Avionics Systems Conference 15. Oct. 1990, Virginia Beach, pp. 306–309.

Robinson, Thomas H. et al. "Advanced Real Time Integrated Processors." IEEE Plans '92 Position Location and Navigation Symposium Record. Jan. 1, 1992. pp. 173–178.

Primary Examiner—Michael Zanelli
Attorney, Agent, or Firm—Browdy and Neimark

[57] ABSTRACT

An automatic piloting device for aerodynes uses at least one digital computer receiving information from a set of sensors, and controlling actuators acting on the flight control surfaces, the computer comprising at least one autonomous computing module having hardware and software resources capable of piloting according to any one of the three piloting axes, the module having a means for becoming specific to a given axis from among the piloting axes, and a connection means for connection to the sensors and actuators corresponding to said given axis. It applies notably to the automatic piloting of a helicopter.

14 Claims, 7 Drawing Sheets

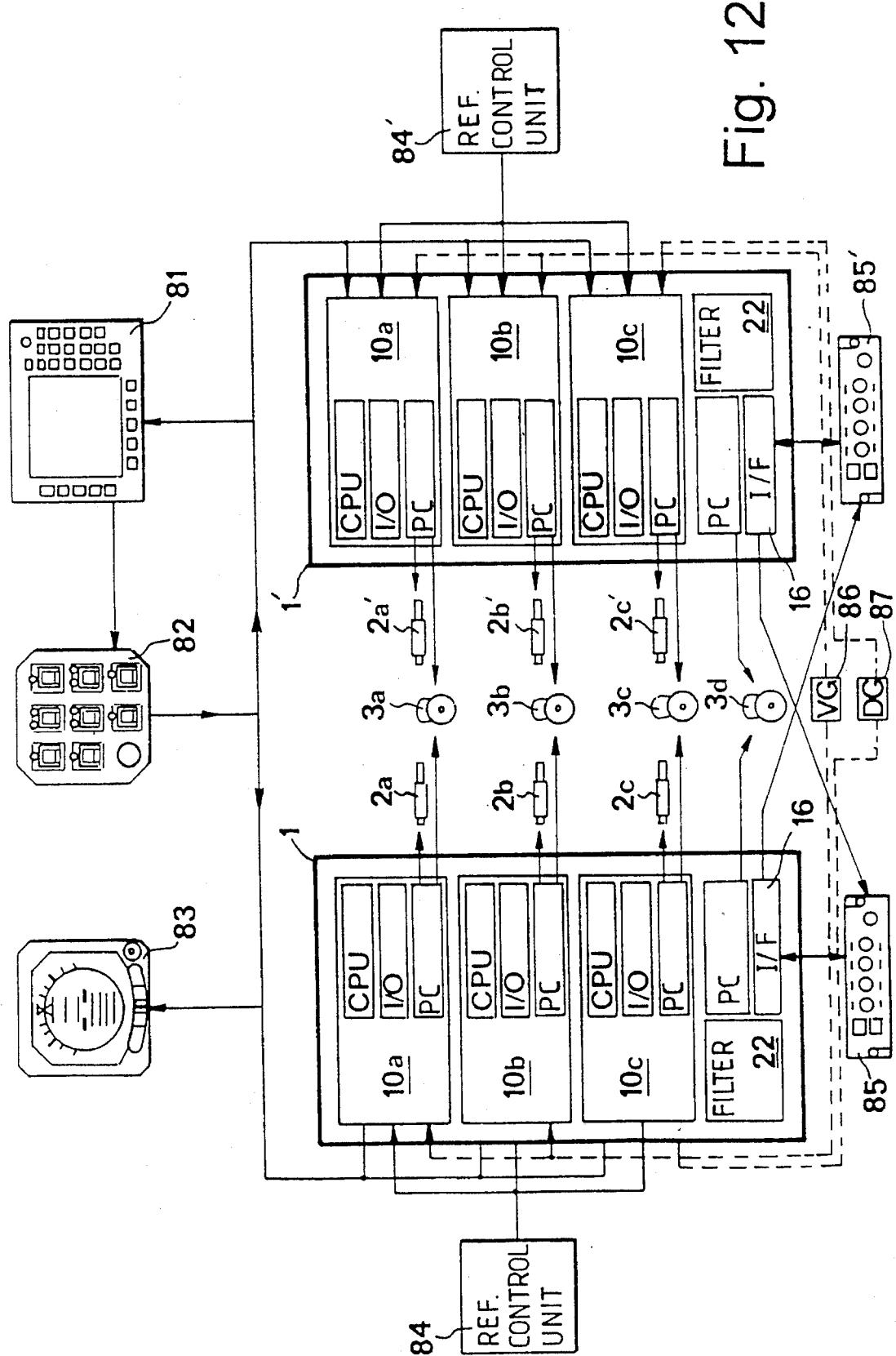

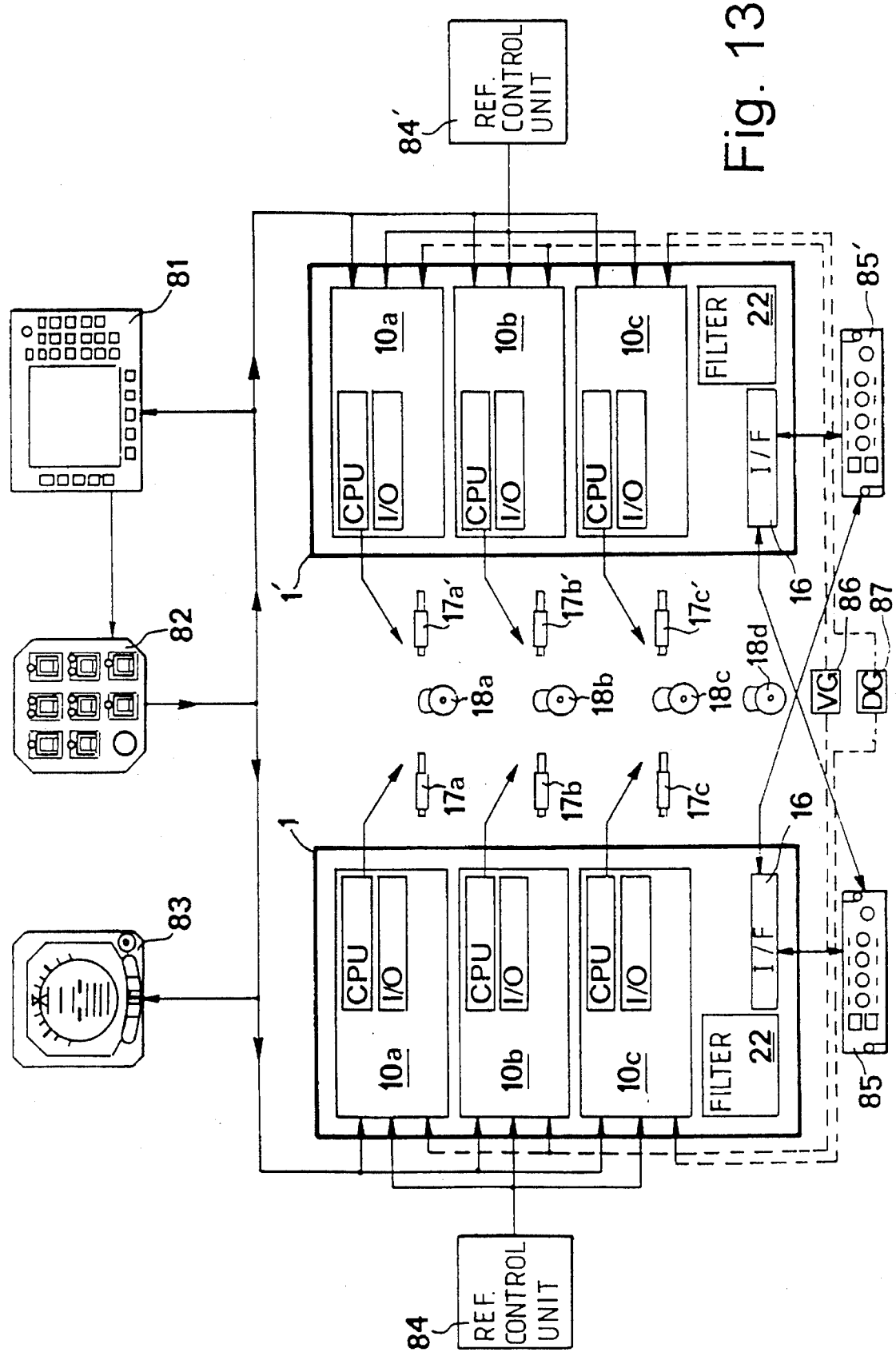

CONFIGURABLE AUTOMATIC PILOTING DEVICE FOR AERODYNES

BACKGROUND OF THE INVENTION

1. Field of the Invention

This invention relates to an automatic piloting device for an aerodyne such as e.g. a helicopter.

The purpose of such devices is generally to unburden the pilot of a certain number of tasks while improving the flight characteristics of the aerodyne which is usually unstable, and while performing certain piloting tasks such as the maintaining of the aerodyne on a certain trajectory selected by the pilot.

The aim of the automatic piloting devices intended to equip helicopters is more particularly to improve the stability of the aircraft during manual piloting, and to provide the pilot with an impression of greater stability and homogeneity as regards the characteristics of the effects of the different flight control surfaces.

2. Description of the Prior Art

Up to now, these devices carried out, for each of the three piloting axes (roll, pitch and yaw), an analog computation enabling controlling of the set of actuators acting on the flight control surfaces as a function of commands from the pilot and the information provided by the sensors.

Generally, the actuators for a piloting axis comprise a low-authority series thrustor with very fast motion, and a trim thrustor with full authority and slower motion, intended to recenter the position of the series thrustor.

In view of the fact that each piloting axis is governed by different automatic control laws, each computation is different. It ensues that the cost of such a device is very high as each computer must be designed, tested and certified individually.

Moreover, helicopters are intended to carry out a large number of missions. In order to be authorized to fly and to carry out these missions under satisfactory safety conditions, a helicopter must be submitted for certification. This certification mainly concerns the safety of the helicopter and third parties it flies over. It deals with the devices susceptible of having an impact on its level of safety, and notably the automatic piloting device.

In view of cost considerations and because the flight characteristics of helicopters can be very different from one model to another, the equipment therein must be adapted to their features and to the missions for which they are intended.

Since the emergence of digital technologies, proposals have been made, with a view to integrating a large number of functions into a system that is less cumbersome, while being open-ended and more easily maintained, to integrate all the functions of the three analog computations of the automatic piloting device into a single digital computer. This solution allows considerable flexibility in adapting the device to each type of utilisation, this adaptation being possible by simply changing the version of the programme piloting the actuators. However, though this solution avoids having to manufacture a computer for each type of aircraft and for each type of mission, it does not dispense with the certification stage for each version.

Furthermore, the computing power required varies significantly depending on whether one or three axes must be controlled simultaneously, and therefore, in order to optimize costs, several hardware configurations of the piloting device must nonetheless be proposed in order to meet the mission requirements in as satisfactory a manner as possible.

Digital computers for automatic piloting are usually comprised of several electronic boards corresponding to the digital heart, power supply, I/O management, and generating of actuator power commands. All these boards communicate with one another via an interconnection board known as a "backpanel" board.

This structure implies that each board be identified separately, prior to integration and identification of the overall computer.

Furthermore, in order to repair a faulty computer, the entire unit must be tested to locate the faulty board. Once it has been repaired or replaced, the latter must be tested separately and then integrated into the overall computer which must be retested for acceptance.

This structure thus leads to relatively complex, and therefore costly, maintenance and acceptance procedures.

OBJECT OF THE INVENTION

The main object of this invention is to remedy the preceding drawbacks, particularly to provide an automatic piloting device for an aerodyne, using a digital computer receiving information from a set of sensors and controlling actuators acting on the flight control surfaces.

SUMMARY OF THE INVENTION

Accordingly, the device is characterized in that the computer comprises at least one computing module with hardware and software resources capable of piloting according to any one of the three piloting axes, said module comprising a means for rendering it specific to a given axis among said piloting axes, and a means for connecting itself to the sensors and actuators corresponding to said given axis.

Within this device, each computing module uses digital and analog technology, and in order to be capable of processing each piloting axis indifferently, it integrates functions specific to each piloting axis.

Thus, in order to simultaneously process all three piloting axes, this automatic piloting device is capable of receiving three identical computing modules, each being susceptible of being completely independent of the two others. In this way, a failure in one of the modules does not therefore risk interfering with the other two. By way of this arrangement, it is possible to avoid having to multiply the computing sequences to ensure a certain level of safety.

Furthermore, this modular approach enables the proposing of a configuration adapted to each type of helicopter and each type of certification, the minimum configuration comprising just one computing module which thus controls and monitors one single piloting axis.

According to a feature of the invention, each computing module integrates, on a single board, all the connectors enabling it to interface directly with the sensors and actuators, a power circuit enabling it to directly control the actuators, with no interconnection being provided between modules inside the box housing the modules.

By means of this configuration, testing and maintenance of the computer are limited to testing and maintenance of the computing modules, independently of one another.

Furthermore, certain actuators are equipped with a power control circuit, in which case computing modules must be provided without a power control circuit.

With a view to further improving the flexibility of adaptation and therefore to reducing the manufacturing and maintenance costs of such a computer, each computing module comprises at least one plug-in module grouping together the power control and I/O management circuits of the computing modules most likely to vary from one configuration to another.

With this provision, the computing module can be finely adapted, without any modification of its architecture, to most of the possible configurations of the automatic piloting device.

These arrangements enable the obtaining of a modular automatic piloting device that is simplified from the point of view-of hardware, and therefore of considerably lower manufacturing and maintenance costs than the systems already proposed.

BRIEF DESCRIPTION OF THE DRAWINGS

Further features and advantages of the invention will be apparent from the an embodiment of the invention described, by way of a non-limiting example, in reference to the corresponding accompanying drawings in which:

FIGS. 11, 12 and 13 show several examples of different possible configurations of the piloting device.

DESCRIPTION OF THE PREFERRED EMBODIMENTS

Figure 1:
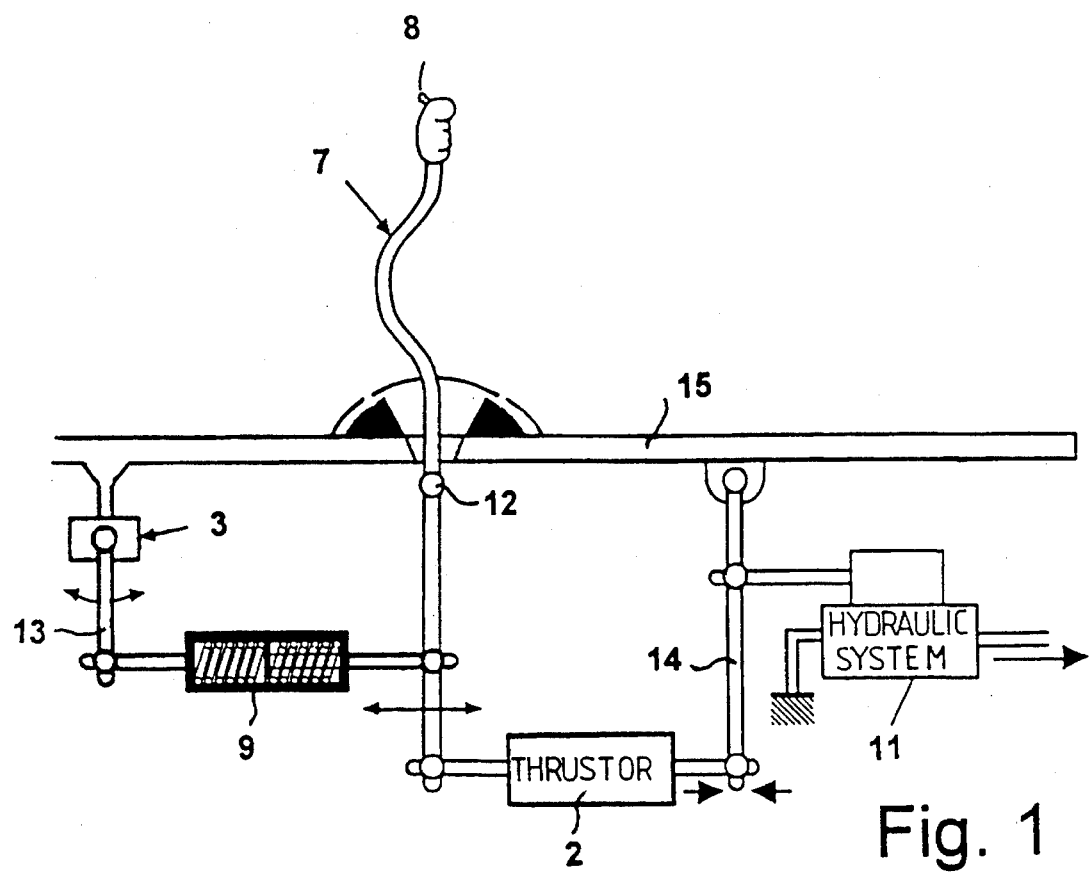
FIG. 1 schematically represents the automatic piloting device within an attitude control system according to one helicopter piloting axis.

FIG. 1 represents the different piloting elements according to one of the pitch or roll axes. These elements comprise a control column 7 which is operated by the pilot and extends through the floor 15 of the cockpit in order to pivot about an axis 12. The end opposite the control column 7 extends to form a lever acted on, on the one hand, by a device 9 intended to apply to the control column a resisting force complying with a predetermined law of exertion, and, on the other hand, by a series thrustor 2.

This device 9 comprises a fulcrum attached to a lever 13 operated by a motor 3 called trim thrustor and fixed to the floor 15.

The other end of the series thrustor 2 operates another lever 14 which pivots about an axis interdependent with the floor 15. This lever 14 enables the distributor of a hydraulic system 11 to be operated, said system acting directly on the flight control surfaces of the helicopter.

In this structure, the trim thrustor 3 is intended to slowly recenter, while offsetting all the rods, the position of the series thrustor 2, whose motion is very fast, in order to bring it back to the neutral position and to restore its piloting authority to it.

Figure 2:
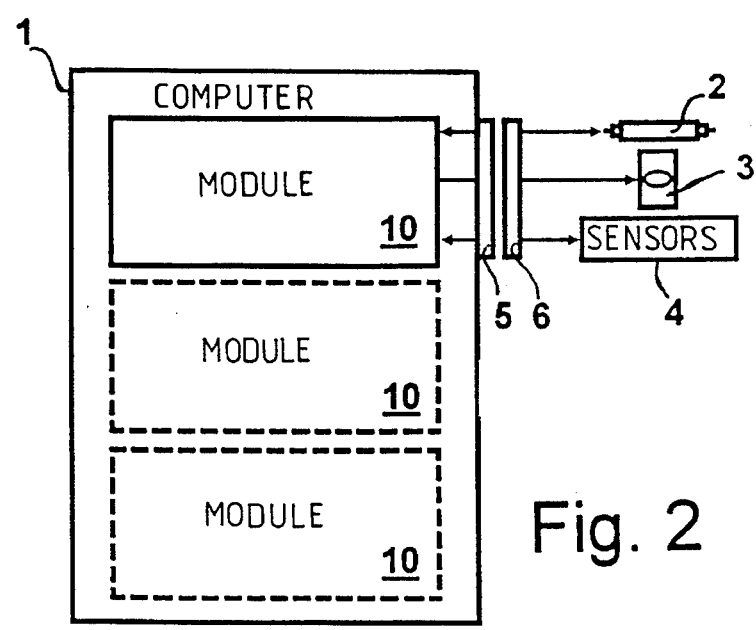
FIG. 2 schematically represents the hardware architecture of the computer connected to the actuators and set of sensors.

In FIG. 2, the computer 1 comprises a module 10 which exchanges information with a set 4 representing the sensors, the helicopter cockpit and possibly test equipment.

It is designed to take two other modules 10 (represented in broken lines) identical to the first one, enabling the two other piloting axes of the helicopter to be controlled.

The module 10 enables direct controlling of the series thrustor 2 and trim thrustor 3 of a piloting axis as a function of information coming from the unit 4. For this purpose, it has a contact pin 5 which fits into a contact socket 6 bringing together all the ends of the electrical links from the sensors, actuators and cockpit.

This figure shows the minimum configuration provided by the automatic piloting device. According to this configuration, the computer 1 comprises a single module 10 dedicated to controlling the piloting according to the yaw axis.

This configuration notably enables yaw damping or automatic course holding as a function of the information from the available and connected sensors.

Figure 3:
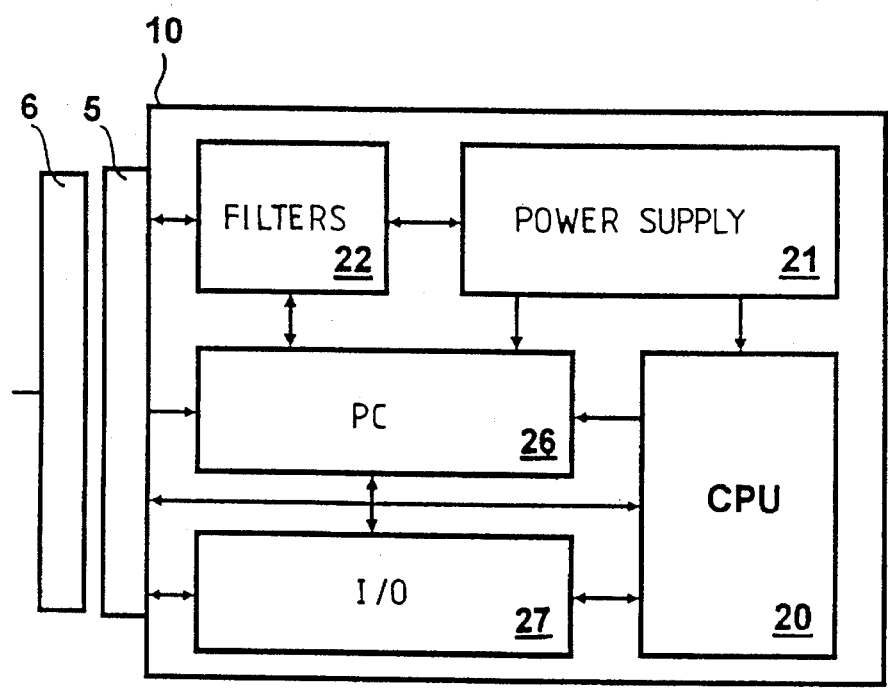
FIG. 3 schematically represents the hardware architecture of a module of the computer.

In FIG. 3, each computing module 10 comprises:

- a digital heart 20 comprising notably a microprocessor and memories enabling a programme and data to be stored;
- a data I/O management circuit 27, irrespective of whether said data are digital or analog data from or to other modules 10 of the computer 1 and other helicopter equipment;
- a power control circuit 26 for the actuators of a piloting axis receiving the value of the position of the series thrustor, and, from the digital heart 20, the analog command instructions to be applied to the actuators of the piloting axis under consideration;
- a feed circuit 21 enabling DC power to be supplied to the different circuits of the module 10; and
- a filtering and protection circuit 22 for protection against the effects of lightning and electromagnetic radiation, and notably for protection of the power commands from the power control circuit 26 to the actuators of the piloting axis.

The I/O management circuit 27 can notably receive data from the other equipment in the helicopter, such as e.g. the vertical control unit, altimeters, navigational systems following radio navigation markers, or equipment measuring its speed with respect to the air. This information can be used by the digital heart 20 to perform high-level functions such as e.g. navigational functions.

The digital heart 20 communicates directly with the cockpit and test equipment via a series link. It has of all the hardware and software resources to perform the following functions:

- initialization of the module and programme,
- real-time scheduling and management of interruptions,
- management of the I/O ports, memory and loading of the programme,
- computation of the piloting instruction to be applied to the actuators to which it is connected, by means of the piloting laws of the axis under consideration, maintenance of the system and management of the tests to be conducted before and during each flight, and management of the series links enabling it to communicate with the test equipment and cockpit.

The instruction computing function also comprises high-level piloting functions such as e.g. navigational functions.

Figure 4:
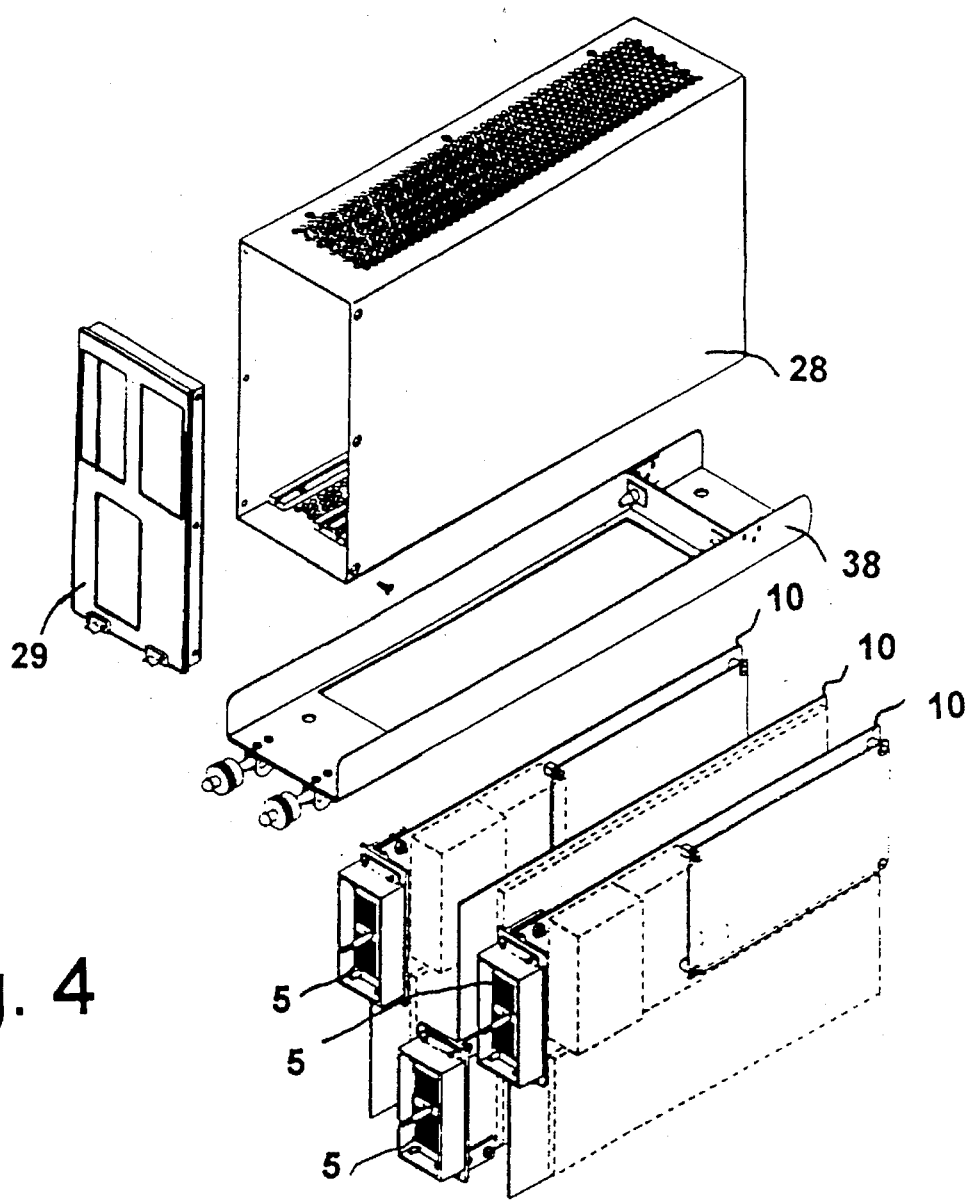
FIG. 4 shows an exploded view of the housing of the computer in which one, two or three identical modules can be installed.

As represented in FIG. 4, the computer 1 comprises a parallelepiped housing 28 closed off by a front side 29 with three rectangular openings, and an attachment base 38. In this housing can be installed one to three identical modules 10 in the form of an electronic board comprising notably a multipoint pin connector 5 accessible via one of the openings on the front side 29.

As the piloting laws to be implemented differ from one piloting axis to another, the instruction computing and test functions include specific functions for each piloting axis. In order to determine which piloting laws to implement, each module 10 recognizes the piloting axis it must process according to the method of connection of its external connector. Thus, no particular manipulation is required to indicate, to each module 10, which piloting axis it must control.

Figure 5:
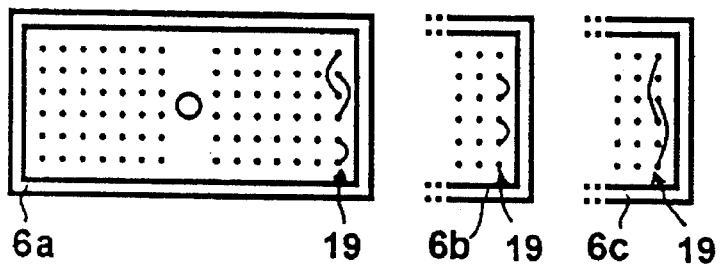
FIG. 5 shows three external connectors having different plugging charts.

For this purpose, the connectors 5, 6 comprise a set of idle connecting points 19 (corresponding to a column of points on the connector) which are used to enable each computing module to recognize the piloting axis corresponding to the actuators and sensors to which it is connected, in order to be able to configure itself. FIG. 5 shows three examples of interconnection between the points of this set 19 made on the socket connector 6 connected to the environment of the module 10.

Moreover, the digital heart of each module 10 also has a self-configuring function which triggers, when the module is powered up, to determine the interconnections between the points of this set 19 at the level of the socket connector 6, each piloting axis corresponding to a specific plugging chart.

To do so, the self-configuring function successively positions each point of this set 19 at logic "1" and reads the logic levels of the other points in this set 19.

In order to ensure that two modules cannot be assigned to a same axis, the self-configuring function sets up a dialogue between the modules in the housing 11, during which each module transmits a code identifying the axis to which it is connected and checks that no other module has transmitted the same code.

Figure 6:
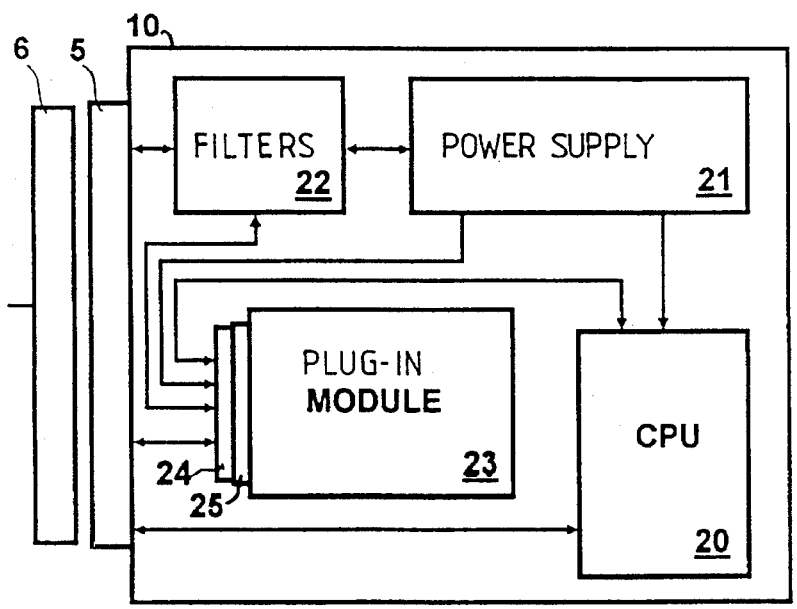
FIG. 6 shows the diagram of a computing module provided with a plug-in module.

According to the embodiment represented in FIG. 6, the power control and I/O management circuits are grouped together in a plug-in module 23. To this end, each computing module 10 comprises a connector 24 intended to receive a connector 25 provided on the plug-in module 23.

Figure 7:
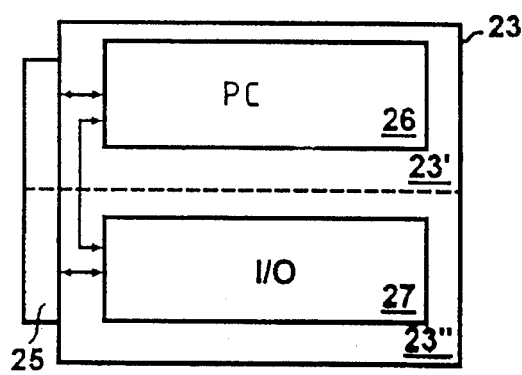
FIG. 7 schematically represents a plug-in module.

In FIG. 7, each plug-in module 23 comprises:

a data I/O management circuit 27, irrespective of whether said data are digital or analog data from or to other helicopter equipment, and possibly from or to other computing modules 10 of the computer 1; and a power control circuit 26 for the actuators of a piloting axis receiving the value of the position of the series thrustor, and, from the digital heart 20, the analog command instructions to be applied to the actuators of the piloting axis under consideration.

In order to further improve its flexibility of adaptation, the computing module 10 can receive two plug-in modules 23' and 23", one 23' of which includes the power control circuit 26, and the other 23" including the I/O management circuit 27.

In this way, if the actuators are fitted with their own power control circuit, the computing module only receives the plug-in module 23" including the I/O management circuit 27 adapted to this configuration.

Whether situated in the computing module 10 or in a plug-in module 23 or 23', the power control circuit 26 comprises two independent circuits, one enabling the series thrustor (FIG. 8) to be controlled, while the other enables the trim thrustor (FIG. 9) to be controlled.

Figure 8:
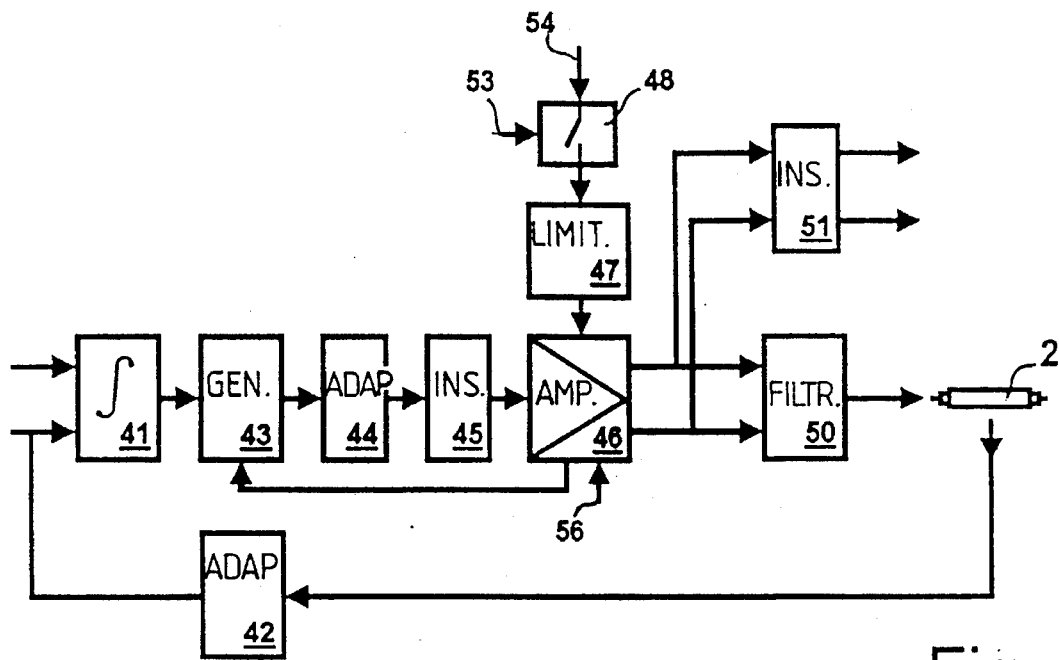

The circuit represented in FIG. 8 enables the motor of the series thrustor 2 to be controlled from instructions generated by the digital heart 20 and converted into analog values by the I/O management circuit 27.

This circuit also receives, at input, the value of the position of the series thrustor 2, which transits beforehand via a voltage adapting circuit 42.

The analog instruction and the value of the position of the series thrustor are firstly added by a summing integrator 41 of which the resulting value drives a pulse generator 43.

The output signal of the pulse generator 43 passes through a voltage adapting circuit 44, followed by a galvanic insulation circuit 45, before being processed by a power amplifier with a H bridge 46. The signal thus amplified is then transmitted, via an L filter 50, to the series thrustor motor.

The power amplifier 46 is powered by a 28-volt voltage 54 via a switching circuit 48 and a current limiter/breaker 47, and the signal it issues at output is transmitted to the digital heart which can thus, notably during pre-flight testing phases, monitor the commands applied to the series thrustor via another galvanic insulating circuit 51.

Furthermore, the H-bridge power amplifier 46 used in the control circuit (FIG. 8) can be manually inhibited by the pilot, either directly via the input 56, or by transmission of a signal 53 to activate the power cut-off switch 48.

Figure 9:
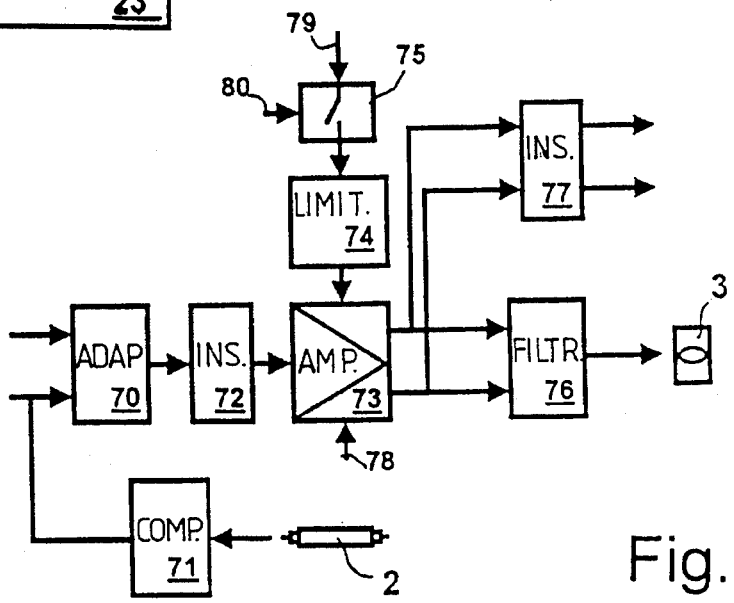
FIGS. 8 and 9 schematically represent two parts of the power control circuit.

FIG. 9 represents the circuit controlling the power to the motor of the trim thrustor. This circuit receives, at input, the pulsed commands generated by the digital heart which provide the direction and speed of rotation of the trim thrustor 3, and the logic commands generated by hardware 71 which indicate the direction of rotation of the trim thrustor. This device 71 generates these directional commands by means of a threshold comparator, directly from the position of the associated series thrustor 2 to which it is connected. The position of the series thrustor 2 is thus compared with zero to produce, at output, a logic signal representative of the sign of the position of the series thrustor in relation to a central position.

It should be specified that the device 71 is completely independent of the digital heart. Moreover, it is connected to a series thrustor (2) position sensor independent of the one used in generating the power command to this thrustor.

The pulsed and logic commands are transmitted, via a voltage adapting circuit 70 and a galvanic insulating stage 72, to a H-bridge amplifier 73.

Once amplified, these commands drive the trim thrustor motor via an L filter 76, and are transmitted to the digital heart 20 via a galvanic insulating circuit 77.

The power amplifier is supplied with a 28-volt voltage 79 independently of the rest of the power control circuit 26, via a switch 75 and a current limiter/breaker 74.

The trim thrustor command is thus protected in several ways.

Firstly, the power amplifier 73 is designed so as to only generate a trim thrustor command signal if the directional commands generated, on the one hand, by the digital heart 20, and, on the other hand, by the hardware device 71, indicate the same direction. If the directions indicated by these commands are different, the trim motor is not controlled and therefore remains inhibited.

This motor can also be inhibited by cutting the power supply to the power amplifier 73 by means of the switch 75 controlled by the signal 80, or by activating the amplifier inhibition command 78.

Furthermore, the power commands are galvanically insulated by the stage 77 and are transmitted to the digital heart 20 which can then check that the commands thus generated are consistent with the position of the series thrustor.

By way of these arrangements, the circuit controlling power to the trim-thrustor motor is completely independent of the rest of the power control circuit 26. Thus, a failure in the digital heart 20 or power control circuit of the series thrustor 2 systematically entails a blocking of the trim.

Figure 10:
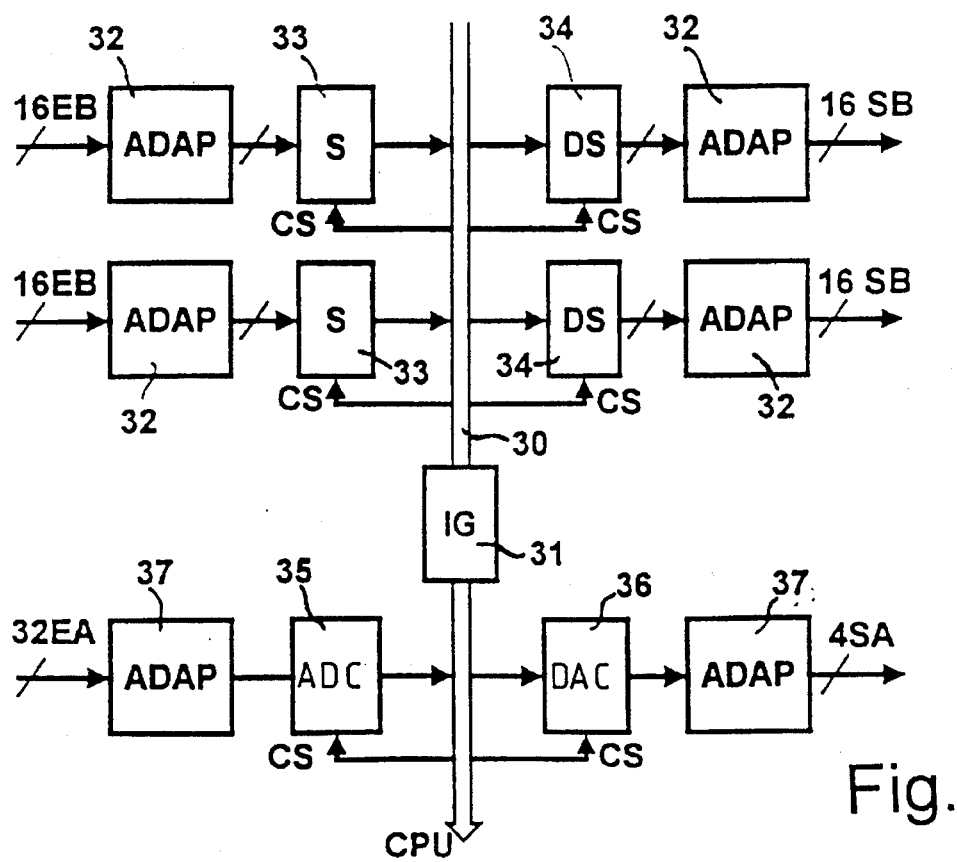
FIG. 10 represents an example of an I/O management circuit.

The I/O management circuit 27 represented in FIG. 10 comprises e.g. twice 16 Boolean data inputs and outputs, respectively 16EB and 16SB, 32 analog inputs 32EA and 4 analog outputs 4SA. The Boolean inputs are connected to a serializer 33 via a voltage adapting circuit 32. This circuit also comprises a bus 30 connected to the digital heart 20 and via which transit the data at input and at output and channel selection signals CS. When one of the serializers 33 receives a signal CS from the digital heart 20, it transfers the data it receives, in parallel form at input, into series form on the bus 30. In order to command the transfer of Boolean data to one of the outputs 16SB, for transmission to other equipment in the helicopter, the digital heart 20 selects one of the deserializers 34 by transmitting a signal CS to it, thereby causing transfer of the data on the bus 30 to the corresponding output 16SB in parallel form, via another voltage adapting circuit 32.

The I/O management circuit 27 can also process analog data. For this purpose, it comprises an analog-to-digital converter 35 enabling transformation into digital values of the analog data at the input 32EA and passing through a voltage adapting circuit 37. In order to receive these analog data, the digital heart 20 transmits, via the bus 30, a selection signal CS to this converter 35 which then transfers, in digital form on the bus 30, the analog data it receives at input.

The bus 30 comprises two parts insulated from one another by a galvanic insulating device 31 so as to separate the part managing the digital data from the part managing the analog signals.

In order to transmit analog data to the other equipment in the helicopter, the digital heart 20 selects the digital-to-analog converter 36 by sending it a signal CS. The data in transit on the bus 30 are then transformed into analog form and transmitted to the analog data output 4SA via a voltage adapting circuit 37.

This circuit 27 also comprises a galvanic insulating circuit enabling the portion of the bus 30 in which the Boolean data are transiting to be insulated from the portion in which the analog data are in transit and which is connected to the digital heart 20.

From the description of the power control circuit 26 and I/O management circuit 27, it appears that these circuits can have a highly variable architecture from one computer configuration to another in order to adapt as finely as possible to the equipment in the helicopter. It is for this reason that they are advantageously arranged on one or two plug-in modules 23, 23', 23", the presence of the module 23' depending on the type of the actuators, with or without integrated power control, equipping the helicopter.

It should also be noted that the number of inputs and outputs the circuit 27 must comprise depends not only on the equipment in the helicopter and the functions performed by the digital heart, but also on the functions performed by the power control circuit 26.

It goes without saying that the connectors 24, 25 are adapted to all possible versions of these two circuits 26, 27 and therefore to all plug-in module configurations provided.

They therefore comprise multiple connection points which are not systematically all used in all configurations of the plug-in module. From this viewpoint, at the time of initializing the computer, the self-configuring function of the digital heart 20 advantageously comprises:

- a means for determining the number and type (Boolean or analog) of the inputs and outputs managed by the plug-in module 23 or 23",
- a means for detecting the presence of the module 23' supporting the power control circuit, and
- a means for determining which power commands are performed by the power control circuit 26, i.e. a means for detecting the presence of the series thrustor 2 control circuit, the series thrustor 2 recentering control circuit, and trim thrustor 3 control circuit.

Moreover, in order to be capable of adapting to all the plug-in module configurations provided, the software controlling the digital heart 20 comprises all the functions required to control the plug-in module(s) 23, 23', 23" with the most complete configurations.

The hardware and software architecture previously presented enables very fine adaptation of the automatic piloting device to the flight characteristics of each helicopter and to the mission for which the latter is intended.

Figure 11:
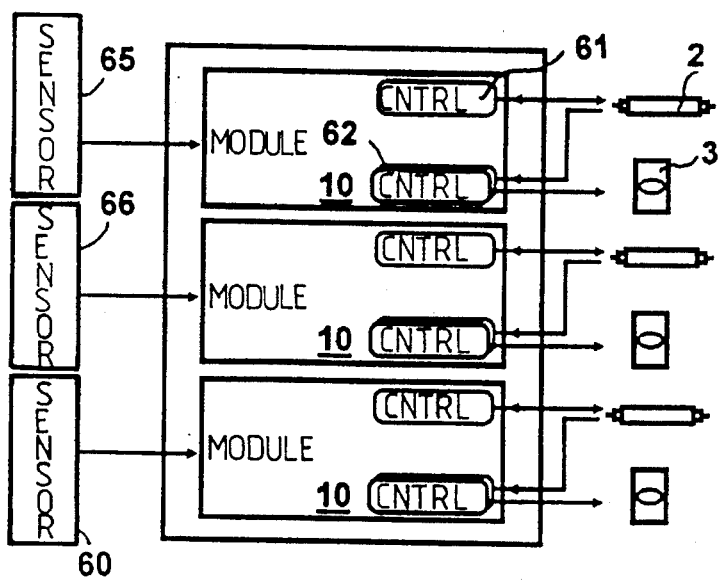

Thus, FIG. 11 shows a configuration of a computer 1 which enables the obtaining of an automatic piloting device acting simultaneously on all three piloting axes. For this purpose, the computer 1 comprises three modules 10 each connected, on the one hand, to its own set of sensors, respectively 60, 65, 66, and, on the other hand, to its own actuators 2, 3.

Only the active command sequences 61 and 62, of each module 10, which respectively operate the series thrustor 2 and the trim thrustor 3, have been indicated. These command sequences include the corresponding functions performed by the digital heart 20, and those performed by the power circuit 26 and by the I/O management circuit 27.

As previously mentioned, the automatic piloting device can perform high-level piloting functions. For this purpose, the computer can be connected to a control box placed in the cockpit. These piloting functions concern the following:

maintaining of the aircraft at a constant altitude, maintaining of the speed of the aircraft, holding a course, following of radio navigation markers, etc.

The automatic piloting device represented in FIG. 12 thus pilots according to four axes, i.e. the pitch, roll, yaw and collective axes, and in order to ensure a high level of operating safety, comprises two control surface command sequences per piloting axis.

To this end, this device comprises two computers 1 and 1', each equipped with three computing modules 10a, 10b, 10c for automatic piloting respectively according to the pitch, roll and yaw axes. Each of these piloting axes is equipped with two series thrustors 2a, 2a'– 2b, 2b'–2c, 2c' mounted in series on the rods of the corresponding flight control surface, and with a trim thrustor 3a, 3b, 3c. The two series thrustors of each piloting axis are respectively controlled by the two computers 1, 1', while each trim thrustor is operated by the two computers.

The two computers 1, 1' receive, via a network using a particular protocol such as ARINC 429, information from:

a navigation computer 81, a flight management computer ensuring piloting according to the instructions supplied by the navigation computer 81, a flight indicator 83, a respective horizontal reference and attitude control unit 84, 84', and possibly a gyroscopic vertical attitude and directional reference unit 86, 87.

The computing modules 10a, 10b, 10c are each equipped with a digital heart "CPU", an I/O management module "I/O", and a power control module "PC". Furthermore, the computing modules of the two computers 1, 1' are interconnected so as to, on the one hand, control one of the two series thrustors, e.g. 2a, 2b, 2c and the trim thrustor 3a, 3b, 3c of the corresponding piloting axis, and, on the other hand, monitor the service quality of the control sequence of the other series thrustor 2a', 2b', 2c'. In this manner, in the event of inconsistency between the command sequences of the two series thrustors 2a, 2a' of a same piloting axis, these two series thrustors are automatically recentered, and the automatic piloting for the corresponding axis is de-activated.

Advantageously, the computers 1, 1' are equipped with a filtering and protection circuit 22 to counter the effects of lightning and electromagnetic radiation, a board 16 interfacing with a cockpit 85, 85', and a power control module "PC" enabling activation of the trim thrustor 3d controlling the entire helicopter.

The configuration represented in FIG. 13 uses actuators of the series thrustor type 17a, 17a'–17b, 17b'–17c, 17c' and trim type 18a, 18b, 18c known as "intelligent", i.e. they are equipped with their own power control circuit. The computing modules 10a, 10b, 10c equipping the two computers 1, 1' do not therefore require a plug-in power circuit module, and all the connections of the two computers with the actuators and other equipment in the helicopter are made by the same network.

Thus, by way of the modularity of the computers 1, 1', the device in FIG. 12 can be significantly simplified while maintaining the same functionalities and same level of safety.

We claim:

1. An automatic piloting device for an aerodyne using at least one digital computer receiving information from a set of sensors and controlling actuators acting on flight control surfaces, said computer comprising at least one computing module, said computing module comprising:

computing means for determining piloting commands to be applied to actuators of any one of three piloting axes as a function of information provided by said sensors, configuration means for specifically configuring said computing means to perform automatic piloting for a given axis from among said three piloting axes, and connection means for connecting said computing means to sensors and actuators controlling piloting for said given axis.

2. The device as claimed in claim 1, further comprising a means for defining an identification code specific to each piloting axis, said configuration means comprising a means for reading said identification code, in order to configure said computing means as a function of the piloting axis for which computing means must perform automatic piloting.

3. The device as claimed in claim 2, wherein the connection means comprises multiple connection points and cooperates with an external connector grouping together ends of electrical links connected to the set of sensors and to the actuators corresponding to a piloting axis, said means for defining an identification code specific to each piloting axis being obtained by interconnecting a predetermined set of connection points of said external connector according to a predetermined connecting diagram specific to each piloting axis.

4. The device as claimed in claim 3, wherein each computing module is made of a single electronic board comprising said connection means.

5. The device as claimed in claim 3, wherein said computer comprises at least two computing modules for controlling piloting for at least two piloting axes, said computing modules being interconnected by their respective external connectors.

6. The device as claimed in claim 1, wherein:

said computing means comprise a microprocessor controlled by identical software irrespective of the piloting axis for which computing means must perform automatic piloting, each computing module further comprising:

power control circuit for directly controlling power applied to the actuators of a piloting axis as a function of piloting instructions provided by the computing a feed circuit, an I/O management circuit, and a filtering and protection circuit for protection against the effects of lightning and electromagnetic radiation.

7. The device as claimed in claim 6, wherein each computing module comprises at least one plug-in module grouping together the circuit managing the inputs and outputs of said computing module, and the circuit controlling power to said actuators.

8. The device as claimed in claim 7, wherein each computing module further comprises:

a means for determining the number and type (Boolean or analog) of the inputs and outputs managed by said plug-in module, a means for detecting the presence of said module supporting said power control circuit, and a means for determining which power commands are performed by said power control circuit.

9. The device as claimed in claim 8, wherein the software controlling said computing means comprises all functions required to control all configurations of the plug-in module(s).

10. The device as claimed in claim 6, wherein each computing module comprises two plug-in modules, one including said circuit controlling power to said actuators, and the other including said circuit managing said inputs and outputs of said computing module.

11. The device as claimed in claim 6, wherein said circuit managing said inputs and outputs of said plug-in module comprises a means for receiving and transmitting digital and analog data.

12. The device as claimed in claim 6, wherein said actuators for each of said piloting axes are comprised of a series thrustor with very fast motion and low authority, placed in series on rods of the flight control surface under consideration, and a trim thrustor with slower motion and full authority, for displacing all rods of said flight control surfaces to recenter the position of said series thrustor, and wherein the power control circuit comprises a means for generating power commands for the series thrustor and trim thrustor, from instructions computed by said computing means, by means of piloting laws, and from a value of the position of the series thrustor.

13. The device as claimed in claim 12, wherein said power control circuit comprises a means for controlling said trim thrustor only if the command to be applied to the trim thrustor is consistent with the position of said series thrustor.

14. The device as claimed in claim 13, wherein an instruction commanding said trim thrustor, applied by said computing means to said power control circuit is comprised of a speed and a direction of rotation, and wherein said power control circuit comprises a means for generating another trim rotation direction command from the value of the position of said series thrustor, and a means for controlling said trim thrustor only if said two trim thrustor rotation direction commands are identical.

\* \* \* \* \*